Patented Feb. 10, 1925.

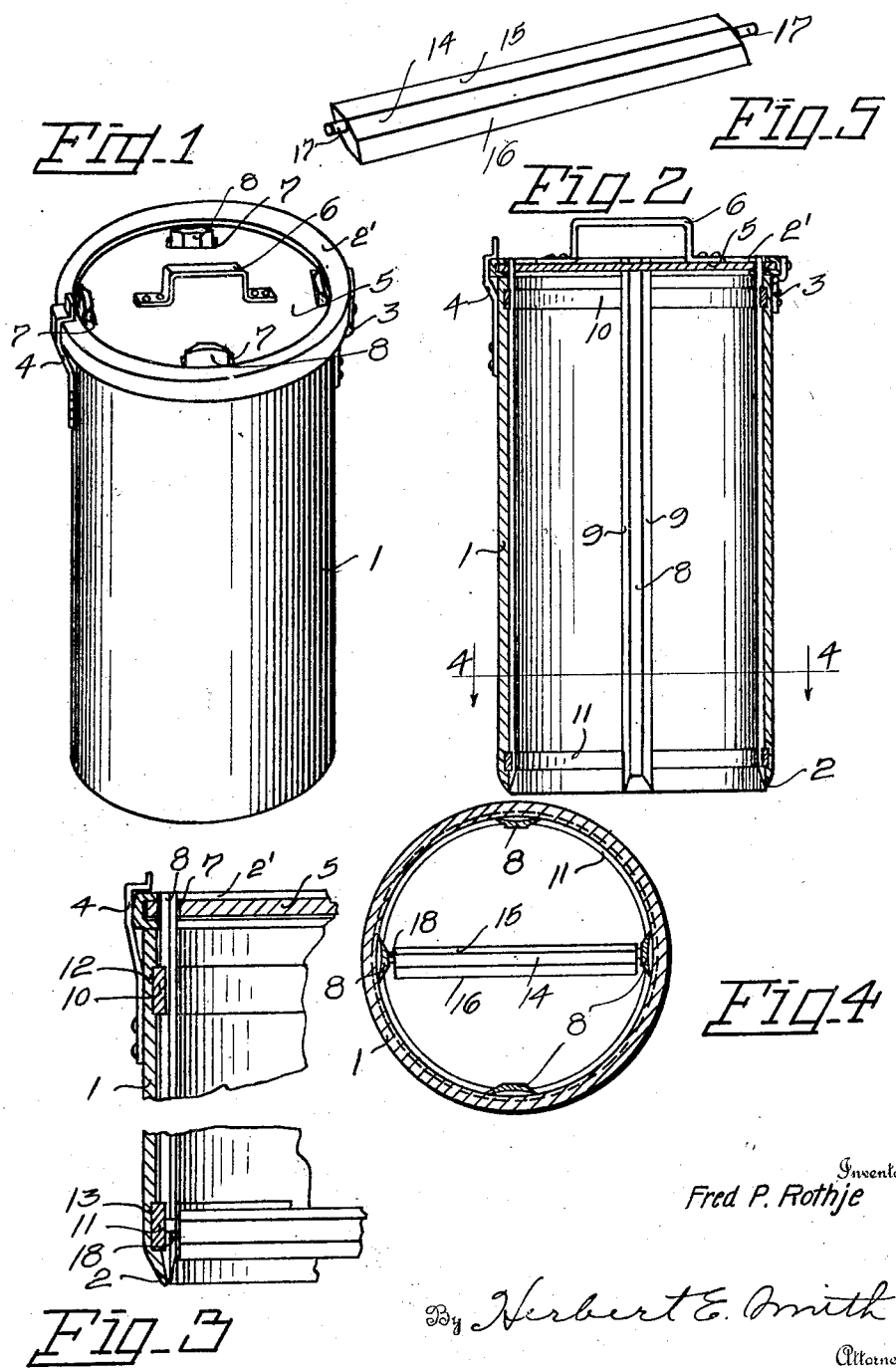

1,525,514

UNITED STATES PATENT OFFICE.

FRED P. ROTHJE, OF SPOKANE, WASHINGTON.

ICE-CREAM DISPENSER.

Application filed April 8, 1924. Serial No. 705,032.

*To all whom it may concern:*

Be it known that I, FRED P. ROTHJE, a citizen of the United States, residing at Spokane, in Spokane county and State of Washington, have invented certain new and useful Improvements in Ice-Cream Dispensers, of which the following is a specification.

My present invention relates to improvements in ice cream dispensers or implements of the hand operated type for dishing ice cream and other ices, which are adapted to cut into the mass of cream, remove a measured quantity, mold it, and discharge or dispense this molded quantity.

The primary object of my invention is to improve devices of this character in such manner as to facilitate the cutting or severing of the quantity from the mass; separate the gathered quantity from the walls of the container and compress this gathered quantity in order that it may readily be dispensed from the container. These objects are accomplished by certain novel combinations and arrangements of parts involving the use of rotary cutters and the structure of the dispenser as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a perspective view of an implement according to my invention.

Figure 2 is a vertical sectional view of the implement.

Figure 3 is an enlarged, vertical sectional view at one side of the dispenser with parts broken away.

Figure 4 is a transverse sectional view at line 4—4 of Figure 2.

Figure 5 is a perspective view of the cutter, detached, that is used for severing the gathered quantity of ice cream from the mass usually contained in a freezer can.

In carrying out my invention I preferably utilize a cylindrical cup 1 which may be constructed of metal or other suitable material, which at its open end is provided with a beveled edge 2 designed to be forced into the mass of ice-cream for gathering the required quantity. These cups may be made in various sizes to contain known quantities, as pints and quarts.

At the upper end of the cup a grooved ring 2' of suitable material is hinged as at 3 to the cup, and this ring which is U-shape in cross section is of the proper diameter to rest upon the top edge of the cup and is adapted to swing away therefrom when desired. A snap or spring hook 4 is secured to the cup diametrically opposite the hinge of the ring and this hook as will be apparent is used to hold the ring in locked relation on the top edge of the cup.

Within the ring is supported a rotatable disk 5 with its edge or circular rim encased within the groove of the ring, and by means of the handle 6 on the top surface of the disk this disk may be turned and guided within the ring. The handle 6 is utilized for manipulating the cup by hand-grasp when forcing the cup into the mass of ice cream, as well as for turning the disk for a purpose to be described.

In Figure 1 of the drawings four slots 7 are illustrated in the disk, these slots being arranged at diametrical points from the center of the disk and spaced equidistant around the disk near its edge and within the ring 2. Within the cup are arranged four longitudinally extending cutting blades 8, the upper ends of which blades are shown projecting through the complementary slots in the disk. These blades are of flat shape with double cutting edges or beveled faces 9 lying close to and parallel with the inner surface of the cylindrical cup and they are rigidly secured to a pair of spaced rings 10 and 11, which are resilient and sprung into complementary annular grooves 12 and 13 in the inner surface of the cup. The two spaced parallel rings 10 and 11 and the four blades 8 carried thereby thus form a rotary cutting frame which is operated by turning the disk 5 by grasping the handle 6. The upper ends of the blades project through the slotted disk and as the disk is rotated the blades are also turned and supported by their rings 10, 11 which revolve in annular grooves 12 and 13. The disk may be turned either clockwise or anti-clockwise and either of the double cutting edges of the blades will be instrumental in separating the gathered quantity of ice cream contained in the cup from the walls of the cup. As the blades are turned, the action of the beveled-edge blades results not only in severing the contained block of cream from the walls of the cup, but the blades compact or compress the block of cream into smaller diameter. This reduced diameter will be the distance between the diametrically opposed blades.

At the lower open end of the cup is journaled a transversely extending cutting blade 14, which as seen in Figure 5 is of flat metal with double cutting or beveled edges 15 and 16, and at the ends of this blade are trunnions 17, journaled at 18 in sockets extending transversely into a pair of opposed cutter blades 8. These pins or trunnions 17 are eccentrically arranged with relation to the longitudinal axis of the blade in order that the blade, which is freely oscillatable in its pin sockets, may hang with its flat sides parallel with the longitudinal walls of the cup in order that as the cup is forced into the mass of ice cream the beveled edge of the flat transverse blade will penetrate the mass of ice cream as a quantity is gathered in the cup. As the cream is forced upwardly into the cup of course the space formed by the penetrating blade is closed and the cup is filled with ice cream. Then when the rotary cutting frame is turned by twisting the wrist of the hand grasping the handle 6, the perpendicular blade 14 is turned to flat position and the beveled edge of the blade as the frame is rotated severs the gathered quantity of ice cream contained in the cup from the mass of cream in the freezer or other container. This same rotary movement of the frame also releases the contained cream and compresses it as described. The device is then removed from the container, the snap hook 4 is released, the ring and its disk are turned back on the hinge 3, and the gathered ice cream is dispensed through the upper open end of the cup.

Having thus fully described my invention, what I claim as new and desire to secure by Letters Patent is—

1. In a device as described the combination with a cup having a pair of spaced interior annular grooves, of a rotary cutting frame supported in said grooves, a rotatable disk operatively connected with said frame, and guide means carried by the cup for said disk.

2. The combination with a cylindrical cup having spaced, interior annular grooves, of a rotary cutting frame supported in said grooves, a guide ring hinged to said cup, and a rotatable disk in said guide ring operatively connected with said frame.

3. The combination with a cylindrical cup having spaced interior annular grooves, of a rotary frame comprising rings supported in said grooves and longitudinally extending blades rigid with said rings adjacent to the cup wall, a hinged guide ring on the cup, and a disk rotatable in said ring having slots to accommodate the ends of said blades.

4. The combination with a cylindrical cup having a hinged interiorly grooved ring and a snap spring-hook on said cup for the ring, of a slotted disk rotatable in said grooved ring, a pair of spaced rings rotatable in annular grooves in said cup, and a plurality of longitudinally extending cutting blades carried by said rings having their ends projecting through the slots in said disk.

5. The combination with a cup having a hinged guide ring and a slotted disk supported to rotate therein, of a rotary cutting frame within said cup having operative connection with the slots in said disk.

6. The combination with a cup having a hinged guide ring and a slotted disk supported to rotate therein, of a rotary cutting frame supported within said cup and comprising cutting members extending longitudinally of the cup with their upper ends projecting through the slots in said disk for operation thereby, and a transversely arranged cutting member carried by said frame.

7. The combination with a cylindrical cup having a hinged guide ring and a slotted disk supported to rotate therein, of a pair of spaced rings supported in annular grooves in said cup, cutting blades affixed to said spaced rings and extending longitudinally of the cup with their upper ends projecting through said slots in said disk and operated thereby, and a transversely extending cutting member carried by a pair of said blades.

In testimony whereof I affix my signature.

FRED P. ROTHJE.